2,820,732

FLUX FOR HIGH NICKEL ALLOYS

Rene David Wasserman, Stamford, Conn., and Joseph Quaas, Island Park, N. Y., assignors to Eutectic Welding Alloys Corporation, Flushing, N. Y., a corporation of New York No Drawing. Application August 10, 1954
Serial No. 448,996

8 Claims. (Cl. 148—23)

This invention relates to nickel alloy welding techniques and particularly to the application of coverings to electrodes having a core material comprising a high nickel alloy. Specifically, the present invention relates to an improved flux composition for application to electrodes formed of iron-chromium-nickel alloys, for example, those core wires commonly denoted Inconel, and also core wires formed of pure nickel, cobalt, molybdenum, carbon, alloys thereof, and the like.

Recent advances in the welding field and particularly in the design of covered welding electrodes for use in metallic arc welding operations, have provided improved electrode materials and covering flux compositions which function to evolve the necessary shielding gas envelope and provide the necessary ingredients for fluxing the weldment and protecting the latter against oxidation and other deleterious actions. An example of such prior advances will be found in U. S. Patent No. 2,576,123 disclosing a covered electrode employing a nickel-chromium-iron alloy as a core material and a flux covering or coating including a mixture of calcium carbonate, barium fluoride, cryolite, and ferro-columbium-titanium powders together with bentonite and dextrine.

Although these new electrodes have provided certain advances over known contemporary prototypes, they have suffered from certain deficiencies in lacking flexibility and ease of application, very poor slag removal quality, poor appearance and a pronounced porosity in the finished weldment. It is therefore a prime object of the present invention to provide an improved covered electrode of this general type which obviates these inefficacies. It is a further object of the present invention to provide an improved flux composition for particular application to high nickel alloy electrode cores which will result in complete elimination of porosity in the finished weldment and at the same time provide excellent slag removal properties. Other and distinct objects will become apparent from the description and claims which follow.

In investigating the advantages and disadvantages of contemporary covered welding electrodes of the above specified type in welding high quality stainless steels and alloys, it has been determined that the inefficacies of electrodes of this type are apparently in part due to the inclusion of glutinous carbohydrates as a binder. Experiment has shown that these organic materials decompose at the elevated temperatures employed in the welding operations to release gases contributing to porosity in the weldment and inhibiting subsequent slag removal by integrating the slag with the weldment metal proper. In particular, it appears that the decomposition of the carbohydrates takes place, in part, while such material is occluded by molten filler metal preventing adequate scavenging as the weldment cools. Occurrence of this action in the presence of a large amount of a soluble fluoride produces excessive porosity and a tightly adherent slag in the finished weldment.

On the other hand, it has been discovered that these disadvantages can be wholly avoided while retaining a flux composition of the same general character by limiting the amount of the fluoride and eliminating the carbohydrate, while substantially increasing the amount of calcium carbonate present. In particular it has been discovered that a flux composition comprising between 30 and 50 parts by weight calcium carbonate, between 10 and 50 parts by weight cryolite, between 10 and 20 parts by weight of a ferro-columbium or titanium alloy, and a small amount of bentonite provides excellent results without encountering the disadvantages noted in prior fluxing compositions for like purposes. In some instances it has been found desirable to make minor additions of titanium dioxide, ferro-molybdenum and/or ferro-aluminum with an unusually effective advantageous increase in the ease of ultimate slag removal.

This discovery was wholly unexpected in view of the fact that known techniques and literature indicated that any substantial increase in the carbonate component would further increase the porosity in the resulting weldment and otherwise generally affect the welding operation. On the contrary, it was discovered that the elimination of the soluble fluoride and dextrine ingredients permits the toleration of up to 50 parts by weight of a carbonate without encountering any deleterious results. This is wholly unexpected in view of prior experience with high carbonate contents. In the instant case it was found that the gaseous envelope evolved from the carbonate did not produce porosity in the weld, and to the contrary, assisted deposition of the electrode core by scavenging the surface of the weld. Further, the presence of greater amounts of metal alloy can be tolerated, i. e. a maximum of sixty parts by weight as compared with approximately 35 parts for said patented invention, by the increase of the carbonate content which has resulted in excellent deoxidizing action.

It was further found that this improved coating composition can be applied with equally desirable results to core wires of pure nickel, cobalt and molybdenum, as well as alloys thereof for application in various stainless alloy welding procedures. In addition, it was discovered that this improved coating composition can be applied to carbon core materials, normally used in a twin or single arc operation when the filler metal is applied separately, with equally effective results.

The flux composition can be compounded in the usual manner as a mixture of comminuted and/or powdered particles held together by conventional binders, as for example, water glass and/or low melting glasses of the type specified in the copending application of Rene D. Wasserman and Joseph Quaas, Serial No. 427,397, filed May 3, 1954. The coating can be applied by dipping from an agitated bath but is preferably extruded directly onto the core wire in a known manner.

A preferred form of the invention comprises a composition consisting of 43.5% calcium carbonate, 29% cryolite, 18.2% ferro-columbium alloy, 1.5% titanium dioxide, 2.9% ferro-molybdenum alloy, 2% ferro-aluminum alloy, and 2.9% bentonite. This composition has been applied to various forms of high nickel alloys and to other pure and alloy electrode core materials of similar type with excellent results.

In practicing the invention, the ferro-columbium alloy and titanium dioxide may be used in any combined ratio up to about 20 parts by weight each, while the ferro-molybdenum and ferro-aluminum alloy constituents may be employed in like manner in any ratio up to 10 parts by weight each. However, the latter alloy constituents are preferably maintained at less than 3% by weight. For certain purposes, as for example in forming a covered electrode for use on stainless 18–8 steels, it is preferred to use larger proportions of the titanium dioxide and ferro-aluminum in about equal parts.

In a more general sense, the invention may be described as comprising a covering composition consisting essentially of a mixture of calcium carbonate, cryolite and ferro-columbium alloy with minor proportions of bentonite, titanium dioxide and a ferro alloy powder or powders. In practice, it is preferred that the ferro-columbium alloy, cryolite and calcium carbonate be applied in substantial proportional amounts aggregating in relative proportions of 3, 5 and 7 with respect to each other, respectively. It is also preferred to employ plural ferro-alloy powders in addition to the ferro-columbium powder, but it will be understood that ferro-aluminum can be used alone and although ferro-titanium has been employed effectively in prior similar fluxing compositions, it is not necessary to resort to the use of such alloy in the instant composition in view of the fact that the ferro-aluminum in combination with the rather substantial amounts of the ferro-columbium operate to perform the same function.

A preferred practical operating range for the composition according to the invention is as follows: between 30 and 50 parts by weight of calcium carbonate, between 10 and 50 parts by weight of cryolite, up to 20 parts by weight of ferro-columbium, between 1 and 5 parts by weight of bentonite, between 1 and 20 parts by weight of titanium dioxide, between 1 and 10 parts by weight of ferro-molybdenum, and between 1 and 10 parts by weight of ferro-aluminum. As will be noted, the ferro-columbium can vary widely and in cases where it is desirable to employ small proportions of such ingredient, it is necessary to increase the cryolite and calcium carbonate in proportionate amounts. It will also be understood that in some instances it will be desirable to employ approximately 20 parts of titanium dioxide, in which case the ferro-columbium content may be decreased along with a decrease in the amount of cryolite present in the ranges specified.

The invention in addition to being particularly applicable to nickel-chromium-iron alloys, stainless steels, and other conventional stainless alloy materials has been found very effective in treating nickel-copper alloys and other corrosion resistant metals including the Monel, Hastelloy and Duranickel alloys when a similar or dissimilar metal is used as the core wire for the electrode.

Another preferred example of the invention which can be applied to electrode core metals for use on stainless steels and the Hastelloy and Monel alloys is as follows:

| | Percent by weight |
|---|---|
| Calcium carbonate | 45 |
| Cryolite | 25 |
| Ferro-columbium alloy | 15 |
| Ferro-aluminum alloy | 6 |
| Titanium dioxide | 6 |
| Bentonite | 3 |

Yet another example which can be applied with particularly effective results to substantially pure nickel electrode cores for use on Duranickel alloys is as follows:

| | Parts by weight |
|---|---|
| Calcium carbonate | 35 |
| Cryolite | 20 |
| Ferro-columbium alloy | 10 |
| Ferro-molybdenum alloy | 10 |
| Ferro-aluminum alloy | 10 |
| Titanium dioxide | 10 |
| Bentonite | 5 |

As many apparently widely different embodiments of this invention may be made without departing from the spirit and scope hereof, it is to be understood that the above invention is not limited, except as defined in the appended claims.

What is claimed is:

1. A composition of matter for use as a covering for arc welding electrodes consisting of:

| | Percent by weight |
|---|---|
| Calcium carbonate | 45 |
| Cryolite | 25 |
| Ferro-columbium alloy | 15 |
| Ferro-aluminum alloy | 6 |
| Titanium dioxide | 6 |
| Bentonite | 3 |

2. A composition of matter for use as a covering for arc welding electrodes consisting of:

| | Parts by weight |
|---|---|
| Calcium carbonate | 35 |
| Cryolite | 20 |
| Ferro-columbium alloy | 10 |
| Ferro-molybdenum alloy | 10 |
| Ferro-aluminum alloy | 10 |
| Titanium dioxide | 10 |
| Bentonite | 5 |

3. A composition of matter for use as a covering for arc welding electrodes consisting of:

| | Percent by weight |
|---|---|
| Calcium carbonate | 43.5 |
| Cryolite | 29 |
| Ferro-columbium alloy | 18.2 |
| Titanium dioxide | 1.5 |
| Ferro-molybdenum alloy | 2.9 |
| Ferro-aluminum alloy | 2 |
| Bentonite | 2.9 |

4. A composition of matter for use as a covering for arc welding electrodes consisting of:

| | Parts by weight |
|---|---|
| Calcium carbonate | between 30 and 50 |
| Cryolite | between 10 and 50 |
| Ferro-columbium | up to 20 |
| Bentonite | between 1 and 5 |
| Titanium dioxide | between 1 and 20 |
| Ferro-molybdenum | between 1 and 10 |
| Ferro-aluminum | between 1 and 10 |

5. A composition of matter for use as a covering for arc welding electrodes consisting essentially of a mixture of between 30 to 50 parts by weight of calcium carbonate, between 10 to 50 parts by weight of cryolite, up to 20 parts by weight of ferro-columbium, between 1 and 20 parts by weight of titanium dioxide, and between 1 and 10 parts by weight each of ferro-molybdenum and ferro-aluminum, and a minor proportion of between 1 and 5 parts by weight of bentonite.

6. A composition of matter for use as a covering for arc welding electrodes consisting essentially of a whole mixture including a major portion ranging from 41–120 parts by weight and a minor portion ranging from 2–25 parts by weight; said major portion consisting essentially of calcium carbonate, cryolite, and a combined mixture of ferro-columbium and titanium dioxide in approximate relative proportions by weight respectively of 7, 5 and 3; and said minor portion consisting essentially in parts by weight of said whole mixture of 1–5 parts of bentonite, and between 1 and 10 parts by weight each of ferro-aluminum powder and ferro-molybdenum powder.

7. A composition of matter for use as a covering for arc welding electrodes consisting essentially of a mixture of between 30–50 parts by weight of calcium carbonate, between 10–50 parts by weight of cryolite, between 10–20 parts by weight of an alloy selected from the group including ferro-columbium and titanium dioxide alloys, and a minor proportion of between 1–5 parts by weight of bentonite.

8. A composition as set forth in claim 7 including the addition of ferro-molybdenum and ferro-aluminum alloys in the proportional range of between 1–10 parts by weight of each.

References Cited in the file of this patent

UNITED STATES PATENTS

| | | |
|---|---|---|
| 2,512,430 | Kihlgren | June 20, 1950 |
| 2,576,123 | Ephraim | Nov. 27, 1951 |